Sept. 18, 1951  G. W. SCHATZMAN  2,567,971
FENDER SHIELD MOUNTING
Filed April 2, 1947  2 Sheets-Sheet 1
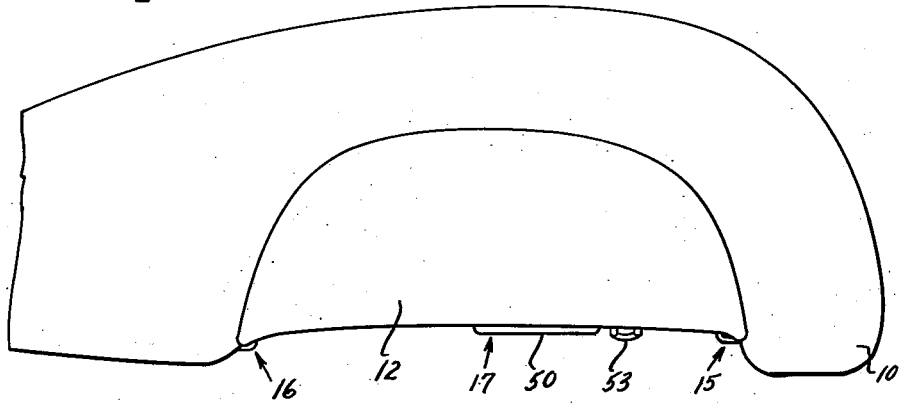
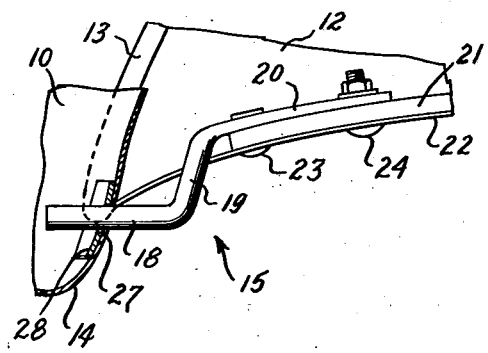
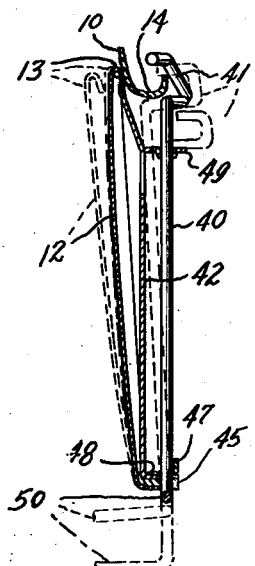
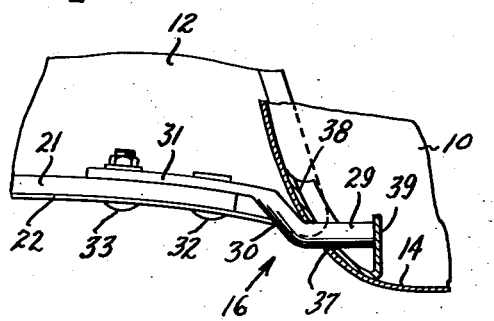
Inventor
George W. Schatzman

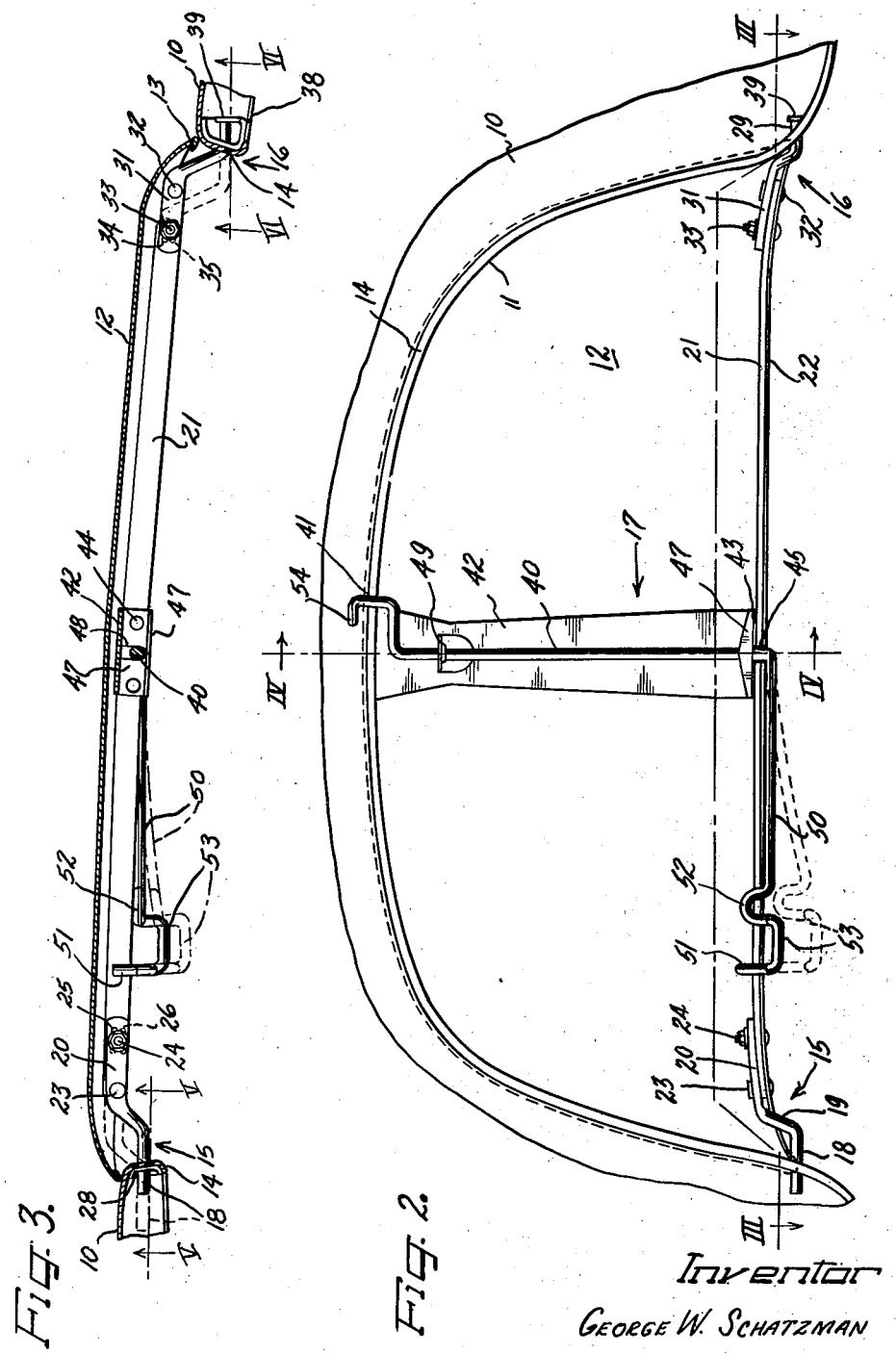

Patented Sept. 18, 1951

2,567,971

UNITED STATES PATENT OFFICE 2,567,971

FENDER SHIELD MOUNTING

George W. Schatzman, Detroit, Mich., assignor to Houdaille-Hershey Corporation, Detroit, Mich., a corporation of Michigan Application April 2, 1947, Serial No. 738,895

15 Claims. (Cl. 280—153)

This invention relates to fender and fender skirt or shield assemblies, and more particularly to an improved assembly of this character including novel means for attaching the fender and fender shield together.

In a vehicle industry, and particularly in the automobile industry, various means have been utilized to improve the appearance of vehicle fenders. The usual vehicle fender is provided with an opening which affords access to the vehicle wheel, and which permits the ready removal or replacement of the wheel in an axial direction. Since this opening inherently presents an unattractive outward appearance, detachable fender shields have been employed to cover the opening ornamentally.

As the term "fender shield" shall hereinafter be employed, it refers to any member which is adapted to be secured to a fender or other portion of a vehicle body for the purpose of covering the opening in the fender or vehicle body which is provided for access to or removal of a vehicle wheel. Furthermore, as the term "fender" shall hereinafter be employed, it refers to any form of wheel fender in its broad sense, whether such fender be separated from the vehicle body part, partly separated from the vehicle body part, or actually an integral part of the vehicle body and whether or not it projects outwardly from the principal body portion of the vehicle.

An important object of the present invention is to provide a novel fender and fender shield assembly in which the fender shield is secured to the fender in a novel manner.

Another object of the invention is to provide a fender shield having improved means for attaching the same to a fender.

A further object of the invention is to provide a novel structure for detachably securing a fender shield to a fender.

Still another object of the invention is to provide new and improved means whereby a fender shield is adapted to be mounted with ease and dispatch in a simple, easily understood and readily executed maneuver.

Other objects, features and advantages of the invention will be readily apparent from the following detailed description of a preferred embodiment thereof taken in conjunction with the accompanying two sheets of drawings, in which:

Figure 1 is a side elevational view of a fender and fender shield assembly embodying the features of the present invention;

Figure 2 is an enlarged inside elevational view of the fender shield and contiguous portions of the fender;

Figure 3 is a horizontal sectional view taken substantially on the line III—III of Figure 2;

Figure 4 is a vertical sectional view taken substantially on the line IV—IV of Figure 2;

Figure 5 is an enlarged fragmentary detail sectional view taken substantially on the line V—V of Figure 3; and Figure 6 is an enlarged fragmentary detail sectional view taken substantially on the line VI—VI of Figure 3.

Having reference to Figures 1 and 2, a fender 10 having a wheel access opening 11 is adapted to have assembled therewith in closing relation a fender shield 12. In the particular form disclosed, the fender shield 12 is of the type which overlaps the outer face of the margin of the fender about the wheel access opening 11 and has an inturned marginal reinforcing flange 13 (Figures 3 and 4) about its end and upper margins. The margin of the fender defining the wheel access opening 11 may be formed with an inturned generally hook-shaped reinforcing flange 14 (Figures 3 and 4).

According to the present invention the fender shield 12 is held in place in closing relation to the fender opening 11 by attachment at three spaced points so organized that the end and upper margins of the fender shield are in the fully mounted relation maintained in snug engagement with the margin of the fender defining the wheel access opening 11. To this end, the forward end of the fender shield has attachment structure 15, the rear end of the fender shield has attachment structure 16, and the center portion of the fender shield is equipped with attachment structure 17. The front and rear attachment structures 15 and 16 are of such character that the fender shield 12 can be preliminarily assembled with the fender 10 by a simple manual maneuver, and thereafter the final assembled relationship of the fender shield and fender effected and the central attachment structure 17 rendered operative to maintain the assembled condition.

The front and rear attachment structures 15 and 16, respectively, are of a nature to effect an assembled relationship with the fender 10 by relative longitudinal manipulation of the fender shield 12 as a preliminary step in the assembly and then swinging of the fender shield into the final assembled relationship with the fender. Accordingly, the front end attachment structure 15 comprises a trunnion-like pin 18 which extends on an axis substantially parallel to the fender shield 12 and in a place spaced rearwardly from the front lower corner of the fender shield. At its outer extremity, the attachment pin 18 extends somewhat beyond the end of the fender shield. The inner portion of the pin 18 comprises an integral attachment neck 19 which is angled toward the fender shield 12 and is formed with a flattened attachment arm or flange 20 offset from the pin 18 and fashioned to be of substantially complementary shape and lie upon the adjacent end portion of a reinforcing bar 21 carried by a lower marginal inwardly extending reinforcing flange 22 on the fender shield.

Adjacent to the juncture with the offsetting neck 19, the attachment flange or arm 20 is secured in assembly with the reinforcing bar 21 and the fender shield reinforcing flange 22 by means such as a rivet 23. Adjacent to its opposite end, the attachment flange is secured in the assembly by means such as a bolt 24. The attachment flange 20 and the reinforcing bar and flange assemblies 21 and 22 have obliquely crossing slots 25 and 26, respectively (Figure 3), through which the bolt 24 extends, and by which angular adjustment of the pin 18 about the pivot provided by the attachment rivet 23 is adapted to be effected.

In the preliminary assembly of the fender shield 12 with the fender 10, the attachment pin 18 is inserted through a bearing aperture 27 formed for this purpose in the marginal reinforcing flange 14 of the fender at the lower front corner of the access opening 11 (Figure 5). A registeringly apertured reinforcing plate 28 may be secured to the inside of the flange 14 about the aperture 27, as by means of welding or the like.

The rear end attachment structure 16 comprises a trunnion-like pin 29 of much the same character as the front end pin and which extends substantially parallel to the fender shield 12 in inwardly spaced position adjacent the rear corner extremity of the fender shield and is of a length to project somewhat beyond the end of the fender shield. The pin 29 is connected by an offsetting neck 30 (Figs. 3 and 6) to a flattened attachment flange or arm 31 which is formed to lie upon the adjacent end portion of the reinforcement flange 21 of the fender shield. The arm 31 is secured in assembly with the reinforcing bar 21 and the fender shield reinforcing flange 22 by means such as a rivet 32 adjacent to the juncture thereof with the offsetting neck 30 and by means of a bolt 33 adjacent to its extremity. For angular adjustment of the pin 29 about the pivot provided by the securing rivet 32, the arm 31 and the reinforcing bar and reinforcing flange assembly of the fender shield are formed with diagonally crossing slots 34 and 35, respectively, through which the bolt 33 extends.

In assembly, the rear end attachment pin 29 extends through an appropriately located bearing aperture 37 in the adjacent lower corner portion of the fender marginal reinforcing flange 14. The latter may be appropriately reinforced by a plate 38 secured at the inner side thereof by means of welding or the like and is formed with an aperture registering with the pin aperture 37.

In the preliminary assembly of the fender shield 12 with the fender 10, the front attachment pin 18, which is preferably slightly longer than the rear attachment pin 29, is inserted through its bearing aperture 27 and slid axially by a longitudinal movement of the fender shield until the pin has been inserted to its maximum extent, substantially as shown in broken outline in Figure 3. The relationship of the rear end attachment pin 29 is such that it may thereupon be entered into its bearing aperture 37 in the fender and the fender shield 12 moved longitudinally in the opposite direction until the rear attachment pin 29 is properly received in bearing relation within its bearing aperture.

A stop flange 39 may be formed on the reinforcing plate 38 for engagement by the extremity of the rear end attachment pin 29 in the proper position of the fender shield 12 for assembled registry with the fender 10 about the opening 11. Thereupon the front attachment pin 18 is only partially withdrawn from its bearing aperture 27, and the fender shield is fully supported at its lower margin. In this completed preliminarily assembled relationship, the fender shield 12 is adapted to be swung about the general axis provided by the attachment pins 18 and 29 toward or away from the fender 10, at least within ample limits for effecting assembly and removal of the fender shield.

Since it is desirable that the fender shield 12 be snugly engaged about its end and upper margins with the fender, adjustment of the respective angles of the attachment pins 18 and 29 as permitted by the pivotal riveted and bolted attachment thereof to the fender shield can be effected so that when the fender shield is swung into full engagement with the fender the end portions thereof will be drawn snugly against the fender.

After the fender shield 12 has been rocked into fully assembled relation with the fender, the central attachment structure 17 is actuated to complete the attachment of the fender shield. As best seen in Figures 2 and 4, this central attachment structure comprises a rotary clamping rod 40 mounted on a vertical axis and adapted to be turned to swing an eccentric clamping head 41 into engagement with the marginal reinforcing flange 14 at the top of the wheel access opening 11 in the fender. To this end, a vertical clamping rod supporting, central reinforcement bar 42 which may be formed from sheet metal, is secured to the inner side of the fender shield 12. The bar 42 is secured at its upper end within the marginal reinforcing flange 13 of the fender shield and at its lower end is formed with a right angular foot flange 43 resting upon and secured to the lower marginal reinforcing bar 21 as by means of rivets 44 (Figure 3). The foot flange and the underlying portion of the reinforcing bar 21, as well as the reinforcing flange 22 is slotted inwardly as indicated at 45 to accommodate the lower end portion of the vertical extent of the clamping rod 40 as a bearing. A retaining plate 47 of angular section is secured upon the foot flange and formed with a counterpart outwardly opening slot 48 for receiving the rod and providing a retaining bar across the inner end of the bearing slot 45.

Adjacent to the clamping head 41, and appropriately spaced below the upper edge of the supporting bar 42 is an inwardly struck out bearing ear 49. To afford a sliding bearing for the clamping rod 40 for both rotary and reciprocal axial sliding movement the bearing ear 49 is centrally apertured. Furthermore, the location of the bearing ear 49 is such that in the non-active position of the clamping rod, the eccentric clamping head 41 is adapted to rest upon the bearing ear substantially as shown in dot-dash outline in Figure 4. In this position the head clears the margin of the fender defining the access opening 11 and the fender shield can be rocked into and out of engaging position with the fender.

The lower end portion of the clamping rod 40 is formed with an angularly extending handle portion 50 which is disposed at such an angle relative to the clamping head 41 that when the handle extends outwardly as shown in broken outline in Figure 4, the clamping head 41 is free from clamping engagement with the reinforcing flange 14 of the fender. When the handle 50 is swung forwardly and inwardly the head 41 swings outwardly toward the clamping engagement. The weight of the clamping rod 40 causes it normally to tend to drop slidably down with the clamping head 41 resting on the bearing ear 49.

After the fender shield 12 has been swung into engagement with the fender, the handle 50 is manipulated to slide the clamping rod 40 upwardly until the clamping head 41 is opposite the reinforcing flange 14 whereupon the rod is given a turn to carry the clamping head into clamping engagement with the reinforcing flange 14. Thereupon, the handle 50 is pushed inwardly behind the lower reinforcing flange 22 of the fender shield as permitted by a certain degree of flexure thereof, substantially as indicated in dot-dash outline in Figure 3, until a right angular locking terminal 51 on the handle clears the fender shield flange 22 and the handle is then flexed upwardly until the locking terminal engages over the reinforcing bar 21. This holds the clamping rod 40 locked.

As a reinforcing expedient and also as a tensioning device, the handle 50 is formed adjacent to but slightly spaced from the locking terminal 51 with an upward bend 52 which is adapted in the locked condition of the clamping rod to engage against the inner edge of the reinforcing bar 21 and supporting reinforcing flange 22. This maintains the handle 50 under tension and also serves to limit the outward movement of the end portion of the handle.

For convenience in manipulation of the same, the handle is formed with a finger-engageable, generally rearwardly extending loop 53 intermediate the terminal 51 and the tensioning loop 52.

When it is desired to remove the fender shield 12 the finger looop 53 is engaged and the handle 50 flexed inwardly until the loocking termiinal 51 clears the lower marginal reinforcing flange 22 of the fender shield whereupon the handle is flexed downwardly until the limiting and flexure loop 52 clears the fender shield reinforcing flange 22, substantially as shown in broken outline in Figure 2. Then the handle 50 is swung outwardly to release the clamping head 41 from clamping engagement with the fender reinforcing flange 14. This causes a hook herminal 54 on the clamping head to swing into engagement with the inner edge of the fender flange 14 substantially as shown in dash outline in Figure 4. In this position the fender shield 12 is permitted to swing partially open as indicated in the dash outline but is restrained against free outward swinging, and the person handling the fender shield is thereby given time to grasp the same with both hands at the lower edge for manipulating the fender shield longitudinally to release the lower end attachment pins 18 and 29 from the fender. As an incident to such release, the upper end of the fender shield is first swung back toward the fender so that the retaining hook 54 will clear the fender flange 14 whereupon the clamping head 41 promptly drops down to the bearing ear 49 so that the head will clear the flange 14 and the fender shield can be swung out and removal completed.

After the fender shield has been removed, it can be laid upon its back and the attachment pins 18 and 29 and the clamping head 41 or at least the bearing ear 49 will cooperate to provide a substantially tripod support for the fender shield which will keep the same above a surface upon which the fender shield is laid and thereby protect the edges of the fender shield from damage, scratching or denting thereof as might be caused by objects upon which the edge might be laid.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In combination in a fender shield assembly for use with a fender having a wheel access opening and the fender shield being adapted to close said opening, a fender shield panel, respective substantially fixedly mounted attaching structures on the fender shield panel to join the ends of the fender shield assembly with the fender and comprising respective pins extending endwise fixedly to predetermined limits beyond the fender shield panel, one of said pins being longer than the other pin and being adapted to be assembled with supporting means located on the fender at the adjacent side of the wheel access opening in alignment with said one pin as the first step in assembling the fender shield with the fender whereafter the remaining pin is adapted to be assembled with receiving means therefor on the fender at the remaining side of the wheel access opening.

2. In a fender shield, a panel having a lower reinforcing flange, means for attaching the fender shield to a fender and comprising a one piece bar-like pin structure including a pin portion, an attachment portion, and an offsetting integral neck between the pin portion and the attaching portion, the attachment portion being mounted on the lower reinforcing flange of the fender shield with the pin portion in spaced offset relation to the adjacent surface of the fender shield.

3. In combination in a fender shield assembly, means for clamping the fender shield to a fender including a reinforcing bar member comprising a struck-out ear having a bearing aperture therethrough, a foot flange on said reinforcing bar, said foot flange having a bearing slot extending straight thereinto in generally coaxial alignment with said bearing aperture, a clamping rod extending through said bearing aperture and being received in said slot, and a retaining plate engaging said foot flange and having a counterslot therein receptive of the clamping rod and affording a retaining bar across the open end portion of the bearing slot.

4. In combination in a fender and fender shield assembly, means for securing the fender shield to the fender comprising a pin member mounted on the fender shield, means on the fender affording a bearing opening axially aligned with the pin and dimensioned and located to receive the pin therethrough and to project therebeyond, and stop means carried by the fender in predetermined spaced relation to said pin opening for engaging the end of the pin and limiting the extent of insertion of the pin through said bearing opening.

5. In combination in a fender and fender shield assembly, the fender having a wheel access opening and the fender shield being adapted to close said opening, the fender shield having on the lower part thereof adjacent to the inner portion of each end a respective substantially fixed trunnion member having a trunnion pin portion spaced inwardly from the adjacent end portion of the fender shield and extending endwise of the fender shield, bearing means on the lower portion of the fender at each respective end of the wheel access opening and aligned with and engageable by the respective trunnion pin portions as an incident to respective endwise movements of the fender shield relative to the fender, assembly being adapted to be effected by engaging one of the trunnion pin portions in its bearing means by endwise movement of the fender shield in the direction in which such trunnion pin portion extends and then aligning the remaining trunnion pin portion with its bearing means and moving the fender shield in the endwise direction that the latter trunnion pin portion extends and finally rocking the fender shield up against and into final assembled position with the fender, and conveniently manipulable means on the fender shield for latching the upper portion of the fender shield in place against the fender.

6. In combination in a fender and fender shield assembly, the fender having a wheel access opening and the fender shield being adapted to close said opening and with the margins of the fender shield overlapping the outer principal plane surface of the fender slidably about the opening, the respective lower portions of the opposite ends of the fender shield having mounted thereon at the inner side thereof respective stationary trunnion pin members, the fender having an opening defining flange, said flange having pin receiving apertures therein at the lower end portions of the wheel access opening and axially aligned with the respective trunnion pin members, and reinforcing members secured in position at said flange apertures and having matching pin apertures therein, the distance between the tips of said trunnion pins being greater than the width of the access opening between the apertured portions of said flange so that the pins must be inserted one at a time into their respective bearing apertures in the fender flange, one of the pins being inserted into its bearing flange and the reinforcing member by endwise movement of the fender shield in one direction and the remaining pin being inserted in its bearing aperture by endwise movement of the fender shield in the opposite endwise direction, the fender shield being rockable about the general axis of said pins after they have been inserted in their bearing apertures.

7. In combination in a fender and fender shield assembly, the fender having a wheel access opening and the fender shield being adapted to close said opening, the fender shield having respective trunnion pins mounted at the inner side thereof adjacent to the lower portions of the respective opposite ends thereof, one of said trunnion pins being shorter than the other, and means at the lower portions of the ends of the access opening on the fender providing bearing apertures for the trunnion pins, the longer of the trunnion pins being first insertable into its bearing aperture as an incident to endwise movement of the fender shield in one direction and the shorter of the trunnion pins thereupon being disposable in alignment with its trunnion aperture and movable into its bearing aperture as an incident to movement of the fender shield in the opposite endwise direction, the trunnion pins being then rotatable in the bearing apertures for rocking movement of the fender shield into and out of fully assembled relation with the fender.

8. In combination in a fender and fender shield assembly, the fender having a wheel access opening and the fender shield being adapted to close said opening, the fender shield having at each respective opposite end at the inner side thereof a trunnion pin, the fender having at the respective opposite ends of the wheel access opening means defining respective trunnion bearing apertures, the trunnion bearing apertures being spaced apart less than the total extent from the tip of one of said trunnion pins to the tip of the remaining trunnion pin, whereby assembly of the fender shield with the fender is adapted to be effected by aligning one of the trunnion pins with its bearing aperture and moving the fender shield endwise to insert such trunnion pin into its aperture to a greater extent than ultimately required until the remaining trunnion pin can be aligned with its bearing aperture and by endwise movement of the fender shield in the direction of the last mentioned trunnion pin insert the same operatively in its bearing aperture, and a stop element interposed in the path of the last mentioned trunnion pin to limit the extent of endwise movement thereof into its aperture whereby to avoid overwithdrawal of the first assembled trunnion pin and to maintain the trunnion pins in proper relationship to the fender for rocking of the fender shield and corresponding rotary movement of the trunnion pins in their bearing apertures as an incident to full assembly or removal of the fender shield with respect to the fender.

9. In combination in means for maintaining in operative association a fender and a fender shield and wherein the fender has a wheel access opening adapted to be closed by the fender shield, a pair of supporting members for the lower margin of the fender shield and each of which supporting members includes means for mounting it fixedly in operative relation to one of the respective ends of the fender shield, said members comprising trunnion pin portions, and means comprising respective members at the opposite sides of the wheel access opening axially aligned for bearing engagement with the trunnion pin portions and also fixedly disposed for slidable rotary bearing engagement with the trunnion pin portions, said trunnion pin portions and said rotary bearing engagement means being constructed and arranged to be placed into fender shield supporting engagement by movement of the fender shield from a disassembled to a partially assembled relation to the fender and with the fender shield tilted away from the fender and said trunnion portions and respective associated bearing interengagement means being relatively slidably rotatable for rocking of the fender shield into fully assembled relation with the fender.

10. In combination in means for mounting in operative association a fender and fender shield, a pair of trunnion members arranged to be carried fixedly by the respective opposite ends of the fender shield and each including a trunnion pin portion to project endwise beyond the adjacent end of the shield, and means to be carried in stationary relation by the fender and providing respective trunnion bearings aligned with the trunnion pin portions and spaced apart less than the distance between the tips of the trunnion pin portions so that to assemble said trunnion pin portions one must be inserted in its trunnion bearing and slid longitudinally until the other trunnion pin portion can be aligned with its trunnion bearing and inserted therein by longitudinal movement in the opposite direction.

11. In combination in means for mounting in operative association a fender and fender shield, a pair of trunnion members arranged to be carried fixedly by the respective opposite ends of the fender shield and each including a trunnion pin portion to project endwise beyond the adjacent end of the shield, and means to be carried in stationary relation by the fender and providing respective trunnion bearings aligned with the trunnion pin portions and spaced apart less than the distance between the tips of the trunnion pin portions so that to assemble said trunnion pin portions one must be inserted in its trunnion bearing and slid longitudinally until the other trunnion pin portion can be aligned with its trunnion bearing and inserted therein by longitudinal movement in the opposite direction, the first mentioned of said trunnion pin portions being longer than the remaining trunnion pin portion to accommodate initial longitudinal assembly of the trunnion pin portions with their bearing apertures.

12. In combination in structure for mounting a fender shield on a fender to close a wheel access opening in the fender, a pair of oppositely extending trunnion pin members arranged to be fixedly mounted at the inside of the fender shield adjacent to the respective opposite ends thereof and extending in endwise relation from the respective fender shield ends, and means to be carried by the respective opposite ends of the fender defining the wheel access opening and in axial alignment with the pin members for engagement with the trunnion pins and providing bearing apertures therefor spaced apart less than the distance between the tips of the trunnion pins after mounting on the fender shield whereby longitudinal movement first in one direction and then longitudinal movement in the opposite direction is required in order to insert the trunnion pins successively into their trunnion apertures, one of said trunnion apertures having spaced therefrom in the direction of movement of the trunnion pin thereinto a stop element for limiting the extent of insertion of the associated trunnion pin thereinto.

13. In means for attaching a fender shield to a fender in closing relation to a wheel access opening in the fender shield, a rotary clamping rod having a radially extending handle portion at its lower end, said handle being formed with an end extremity tip locking terminal adapted to engage with a lower inturned flange on the fender shield and in the engaged relation extending generally outwardly angularly to a generally vertically extending contiguous portion, a horizontal finger loop immediately adjacent the locking terminal and joined to said terminal by said vertically extending contiguous portion, and a generally vertical fender shield engaging flexure limit loop immediately following said finger loop and adapted to maintain the finger loop clear of the fender shield in the locked position of the handle for maintaining the finger loop readily accessible to manipulate the handle.

14. In combination in a fender shield assembly, a fender shield panel, a latch mechanism for securing the panel to a fender and comprising an upright rod member, means at the lower margin of the panel providing a bearing for the rod member, said means including an inwardly extending flange structure having an inwardly opening slot within which the rod is bearinged, and a retaining member secured to said flange structure and providing a bar extending across the mouth portion of the slot at the inner side of said rod to retain the rod in the slot.

15. In combination in a fender shield assembly, a fender shield panel, a latch mechanism for securing the panel to a fender and comprising an upright rod member, means at the lower margin of the panel providing a bearing for the rod member, said means including an inwardly extending flange structure having an inwardly opening slot within which the rod is bearinged, and a retaining plate having a horizontal portion secured to said flange structure and a vertical portion extending as a retaining bar across the mouth portion of the slot at the inner side of said rod to retain the rod in the slot.

GEORGE W. SCHATZMAN.

REFERENCES CITED

The following references are of record in the file of this patent:

UNITED STATES PATENTS

| Number | Name | Date |
|---|---|---|
| 2,017,564 | Claud-Mantle | Oct. 15, 1935 |
| 2,048,862 | Haltenberger | July 28, 1936 |
| 2,062,597 | Moore | Dec. 1, 1936 |
| 2,068,732 | Cadwallader | Jan. 26, 1937 |
| 2,222,619 | Jandus | Nov. 26, 1940 |
| 2,334,867 | Fergueson | Nov. 23, 1943 |